Oct. 19, 1926.
P. S. BAUER
1,603,505
AUTOMOBILE LOCK
Filed Sept. 6, 1921
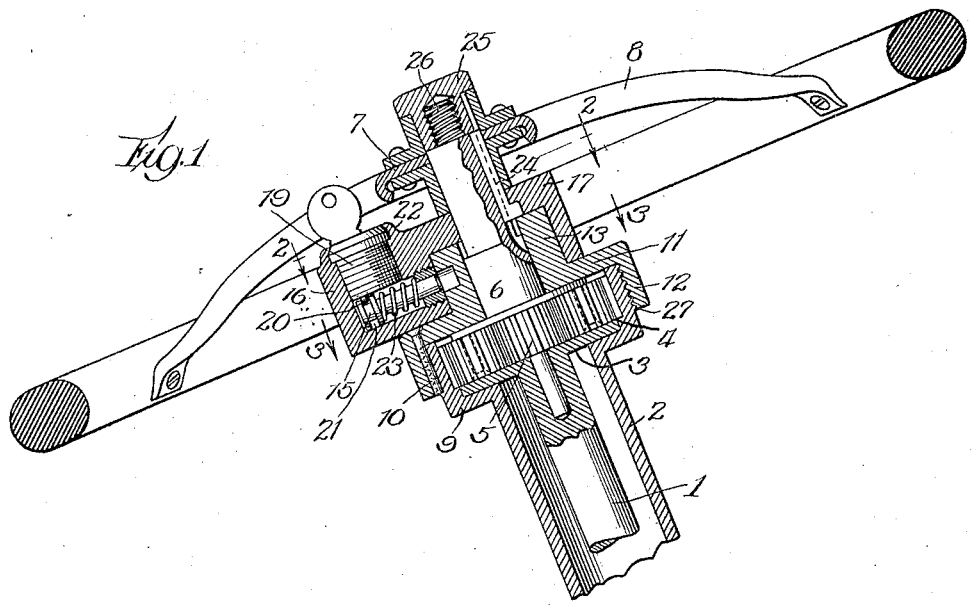
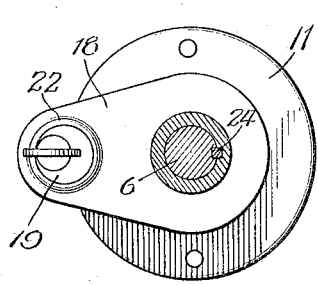
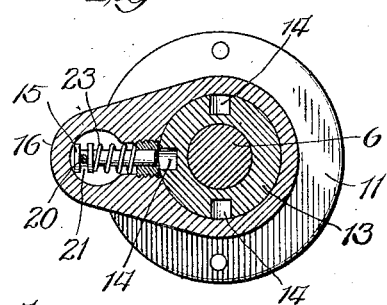
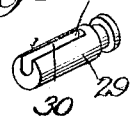
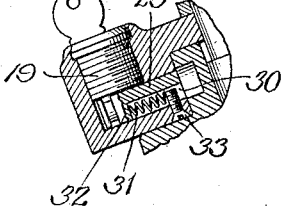
Inventor
Perry S. Bauer
By Wm. O. Belt
Atty.

Patented Oct. 19, 1926.

1,603,505

UNITED STATES PATENT OFFICE.

PERRY S. BAUER, OF CHICAGO, ILLINOIS, ASSIGNOR TO BAUER LOCK COMPANY, OF CHICAGO, ILLINOIS, A CORPORATION OF DELAWARE.

AUTOMOBILE LOCK.

Application filed September 6, 1921. Serial No. 498,661.

The object of this invention is to provide a lock for steering gears which will secure the steering gear against unauthorized operation, and which will effectually resist efforts to release the steering gear by other means than the use of the proper key.

A further object of the invention is to provide a lock structure which will be simple to manufacture, and which can be applied by any person with ordinary mechanical skill and which can be removed without difficulty, when desired.

Further objects will become apparent as the description is read in connection with the accompanying drawing, in which—

Fig. 1 is a vertical section through the device and the associated parts of the steering gear;

Fig. 2 is a transverse section on the line 2—2 of Fig. 1; and

Fig. 3 is a transverse section on the line 3—3 of Fig. 1.

Figs. 4 and 5 are details of a modification.

In the drawings, 1 indicates a shaft rotating in the steering column 2 and carrying at its upper end a disk or flange 3 on which are journalled a series of planet gears 4 meshing with a sun gear 5 fixed to a spindle 6 which carries at its upper end the hub 7 of the steering wheel 8, and which will be claimed as the steering shaft. The upper end of the steering column is equipped with a tubular housing 9 for the planetary gearing and is threaded on its exterior at 10 to receive a cap or cover. The parts so far described are conventional in a well-known automobile. I remove the cap of this structure from the housing 9 and replace it with a cup-shaped lock element 11 having a flange 12 threaded for engagement with the threads 10 and having on its upper side a cylindrical extension 13 equipped with a plurality of radial sockets 14 adapted to receive a plunger 15 mounted in the other element 16 of the lock. This latter element comprises a cup-shaped portion 17 adapted to telescope with the cylindrical extension 13 and having on one side thereof an arm 18 in which the plunger 15 and a lock 19, by which it is moved to locking position, are mounted. I have shown the lock 19 as a conventional form of tumbler lock having an eccentric pin 20 engaging a recess 21 in the plunger 15 whereby the plunger is forced into a socket 14 or withdrawn therefrom, depending upon the direction of rotation of the lock. The barrel of the lock is screwed into the arm 18 and made secure by any suitable means, as a locking key or the like. I prefer, however, to provide a flange 22 which can be burnished over the end of the lock barrel to render it impossible to remove the barrel without the aid of special tools. A helical spring 23 may be assembled about the plunger 15 to normally hold it in retracted position. The bottom of the cap 17 is perforated to receive the spindle 6 and provided with an L-shaped slot to receive the key 24 which serves to key both the cup member and the hub of the steering wheel to the spindle 6. A nut 25 screwed on the threaded end 26 of the spindle 6, fastens the steering wheel and a cup member in place. The purpose of the L-shaped key is to make it impossible for an unauthorized person to remove the nut 25, and the steering wheel 8, withdraw the key from the cup member and a spindle, and then replace the key out of engagement with the cup member and proceed to drive the car away.

In order to prevent the cover 11 from being removed from the housing 9 I provide it with three or more key-ways 27 passing through the threaded portion of the flange 12 and communicating with the upper side of the cap. These key-ways are on the same radii as the sockets 14. In applying the present invention to the car, after the cap 11 has been screwed in position, a hardened pin is driven into each passage 27 cutting a corresponding key way in the threaded portion of the housing 9. I prefer to make these keys of sufficient length for the lower end to be just slightly exposed at the lower end of the flange 12 so that when it is desired to remove the device, a drift can be applied to the ends of the keys to drive them out of the key-ways. By placing these keys on the same radii and opposite to the sockets 14, one of the keys will always be covered by the arm 16 of the upper locking element when the bolt 15 is seated in one of the sockets 14, and it will be therefore impossible for this particular key to be driven out until the arm 18 has been moved.

By providing a plurality of sockets 14 properly located, the steering gear may be locked in position to direct the vehicle straight ahead or cut either to the right or to the left, as may be found desirable.

Instead of winding a spring 23 around the plunger 15 I may use a plunger 29 (Fig. 4) having in one side a longitudinal channel 30 to receive a small helical spring 31 having one end against the shoulder 32 and the other end bearing on a screw 33 threaded through the arm 16. This structure permits the use of a standard machine screw instead of the special threaded ring and places the threaded socket in a much more advantageous position.

I am aware that changes in the form and proportion of parts, and in the details of construction of my invention may be made without departing from the spirit or sacrificing any of the advantages thereof, and I reserve the right to make all such changes as fairly fall within the scope of the following claim.

I claim:

The combination of a steering shaft, a steering column having a tubular housing at its upper end, planetary gearing in said housing, a spindle carrying the sun gear of said planetary gearing, a cover screw threaded on said housing and having a cylindrical extension surrounding said spindle, a cup-shaped member keyed to the spindle and enclosing said extension, said member having a laterally projecting arm, said extension having a plurality of radial sockets, means carried by said arm and engaging one of said sockets for locking said member to said cover, a plurality of key-ways passing through the threads of the cover, and pins driven into each key-way and cutting into the threads of the housing for securing the cover on the housing, said key-ways being located in the same radii as the sockets in said member, whereby at least one of the pins will be covered by said arm when the member is locket to said cover.

PERRY S. BAUER.